US006556200B1

(12) United States Patent
Pfister et al.

(10) Patent No.: US 6,556,200 B1
(45) Date of Patent: Apr. 29, 2003

(54) TEMPORAL AND SPATIAL COHERENT RAY TRACING FOR RENDERING SCENES WITH SAMPLED AND GEOMETRY DATA

(75) Inventors: Hanspeter Pfister, Somerville, MA (US); Kevin A. Kreeger, Port Jefferson, NY (US); Joseph W. Marks, Belmont, MA (US); Chia Shen, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/388,338

(22) Filed: Sep. 1, 1999

(51) Int. Cl.[7] .......................... G06T 15/50; G09G 5/36
(52) U.S. Cl. ...................................... 345/426; 345/557
(58) Field of Search ................. 345/426, 423, 345/427, 522, 537, 557, 606; 711/122

(56) References Cited

U.S. PATENT DOCUMENTS

| | | | | |
|---|---|---|---|---|
| 5,031,117 A | * | 7/1991 | Minor et al. | 345/426 |
| 5,305,430 A | * | 4/1994 | Glassner | 345/420 |
| 5,313,568 A | * | 5/1994 | Wallace et al. | 345/420 |
| 5,361,385 A | * | 11/1994 | Bakalash | 345/31 |
| 5,579,455 A | * | 11/1996 | Greene et al. | 345/419 |
| 5,583,975 A | * | 12/1996 | Naka et al. | 345/424 |
| 5,594,844 A | * | 1/1997 | Sakai et al. | 345/421 |
| 5,933,146 A | * | 8/1999 | Wrigley | 345/420 |
| 6,111,582 A | * | 8/2000 | Jenkins | 345/421 |
| 6,111,583 A | * | 8/2000 | Yaron et al. | 345/421 |
| 6,130,680 A | * | 10/2000 | Cox et al. | 345/503 |
| 6,191,789 B1 | * | 2/2001 | Yamato et al. | 345/424 |
| 6,226,005 B1 | * | 5/2001 | Laferriere | 345/426 |

OTHER PUBLICATIONS

A. Law, R. Yagel, "An Optimal Ray Traversal Scheme for Visualizing Colossal Medical Volumes." Proceedings of Visualization in Biomedical Computing, VBC '96, pp. 33–43. Hamburg, Germany, Sep., 1996.*
J. Nieh and M. Levoy. Volume rendering on scalable shared-memory MIMD architectures. In Workshops on Volume Visualization, pp. 17–24. ACM Press, Oct. 1992.*
"Cache–Conscious Structure Layout", T. M. Chilimbi, M. D. Hill, J. R. Larus, 5/99, SIGPLAN '99.*
"Fast Ray Tracing by Ray Classification", J. Arvo, D. Kirk, Computer Graphics, vol. 21, No. 4, Jul. 1987, pp. 55–64.*
"Introduction to Ray Tracing", Andrew S. Glassner, 1990, Academic Press pp. 204–262.*
Doggett et al.; "A Low–Cost Memory Architecture for PCI–Based Interactive Ray Casting"; Proceeding of the SIGGRAPH–Eurographics Workshop on Graphics Hardware, pp. 7–14, 1999.
Pfister et al.; "The VolumePro Real–Time Ray–Casting System", Proceedings of SIGGRAPH 99, pp. 251–260, 1999.

* cited by examiner

Primary Examiner—Michael Razavi
Assistant Examiner—Ryan Yang
(74) Attorney, Agent, or Firm—Dirk Brinkman; Andrew J. Curtin

(57) ABSTRACT

A method traces rays through graphical data. The method partitions the graphical data into a plurality of blocks according to a scheduling grid. For each block, a ray queue is generated. Each entry in the ray queue representing a ray to be traced through the block. The ray queues are ordered spatially and temporally using a dependency graph. The rays are traced through the blocks according to the ordered list.

7 Claims, 7 Drawing Sheets

TEMPORAL AND SPATIAL COHERENT RAY TRACING FOR RENDERING SCENES WITH SAMPLED AND GEOMETRY DATA

FIELD OF THE INVENTION

This invention relates generally to ray tracing, and more particularly to coherent ray tracing.

BACKGROUND OF THE INVENTION

Systems for visualization need to deal with many graphical components to accurately represent complex scenes. The scene may need to be segmented to allow the viewer to focus on areas of interest. Programmable shading and texture maps are required for complex surfaces, and realistic lighting is needed to model realistic illumination. A number of prior art techniques have been developed to reduce the amount of time it takes to render quality complex scenes. These techniques include culling, lazy evaluation, reordering and caching.

Usually, the techniques, depending on the specific visualization task at hand may use hardware or software solutions. Software solutions are tractable, but do not lend themselves to real-time visualization tasks. To design an efficient hardware architectures for performing programmable volume visualization tasks is extremely difficult because of the complexities involved. Therefore, most hardware solutions are application specific.

For example, ray tracing has been widely used for global illumination techniques to generate realistic images in the computer graphics field. In ray tracing, rays are generated from a single point of view. The rays are traced through the scene. As the rays encounter scene components, the rays are realistically reflected and refracted. Reflected and refracted rays can further be reflected and refracted, and so on. Needless to say, in even simple scenes, the number of rays to be processed increases exponentially. For this reason, ray tracing has been confined to scenes defined only by geometry, e.g., polygons and parametric patched. Ray tracing in volumetric data has universally been recognized as a difficult problem.

For volume visualization, simpler ray casting is generally used. Ray casting is ray tracing without reflected or refracted rays. In ray casting, the effect of reflected and refracted rays are ignored, and attempts to provided realistic illumination are handled by other techniques. Yet, relatively simple ray casting is still computationally expensive for visualizing volume data. For this reason, prior are solutions have generally proposed special-purpose volume rendering architectures.

Recently, hardware acceleration of ray tracing geometric models has been proposed, see ART at "www.artrender.com/technology/ar250.html." The ART design included parallel ray tracing engines which trace bundles of rays all the way to completion before moving on to the next bundled of rays. The input scene data were stored in the host main memory and broadcast to the processor elements. While the shading sub-system included a programmable co-processor, the ray tracing engines were ASIC implementations.

Gunther et al. in "VIRIM: A Massively Parallel Processor for Real-Time Volume Visualization in Medicine," Proceedings of the 9th Eurographics Workshop on Graphics Hardware, pp. 103–108, 1994, described parallel hardware. Their VIRIM architecture was a hardware realization of the Heidelburg Ray Casting algorithm. The volume data were replicated in each module. The VIRIM system could achieve 10 Hz for a 256×256×128 volume with four modules. However, each module used three boards for a total of twelve boards.

Doggett et al. in "A Low-Cost Memory Architecture for PCI-based Interactive Volume Rendering," Proceedings of the SIGGRAPH-Eurographics Workshop on Graphics Hardware, pp. 7–14, 1999, described an architecture which implemented image order volume rendering. The volume was stored in DIMM's on the rendering board. Each sample re-read the voxel neighborhood required for that sample. No buffering of data occurred. While the system included a programmable DSP for ray generation, the rest of the pipeline was FPGA or ASIC.

Pfister et al., in "The VolumePro Real-Time Ray-Casting System," in Proceedings of SIGGRAPH 99, pp. 251–260, described a pipelined rendering system that achieved real time volume rendering using ASIC pipelines which processed samples along rays which were cast through the volume. Cube-4 utilized a novel memory skewing scheme to provide contention free access to neighboring voxels. The volume data were buffered on the chip in FIFO queues for later reuse.

All these designs utilized ASIC pipelines to process the great number of volume samples required to render at high frame rates. The cost-performance of these systems surpassed state-of-the-art volume rendering on supercomputers, special-purpose graphics systems, and general-purpose graphics workstations.

A different visualization problem deals with segmentation. In a medical application, each slice of data was hand segmented and then reconstructed into a 3D model of the object. Current commercial software provides tools and interfaces to segment slices, but still only in 2D. Examining 3D results requires a model building step which currently takes a few minutes to complete. Clearly, this is not useful for real-time rendering. To reduce this time, the segmentation and rendering should be performed right on the volume data utilizing direct 3D segmentation functions and direct volume rendering (DVR), and not by hand.

However, 3D segmentation is still too complex and dynamic to be fully automated and, thus, requires some amount of user input. The idea would be to utilize the computer for the computationally expensive task of segmentation processing and rendering, while tapping the natural and complex cognitive skills of the human by allowing the user to steer the segmentation to ultimately extract the desired objects.

Some prior art segmentation techniques use complex object recognition procedures, others provide low-level 3D morphological functions that can be concatenated into a sequence to achieve the desired segmentation. This sequence of low-level functions is called a segmentation "process." These low-level functions commonly included morphological operations such as threshold, erode, dilate, and flood-fill. For the typical users of medical segmentation systems, this method has been shown to be intuitive and simple to use. The user is given a sense of confidence about the result since the user has control over the process.

In another system, the user is provided with interactive feedback while segmenting. After low-level functions were applied, the resulting segmented volume was displayed to the user, and the user was allowed to choose which function to perform next. The results of one operation assisted the user in choosing the next function. Therefore, the interactivity was limited to one low-level function at a time. If the user had created a long sequence of steps to perform a certain segmentation problem and wanted to see the effect of changing a parameter to one of the low-level functions in the middle of the sequence, then the feedback would not be 3D interactive. Instead the user was forced to step through each stage in the process repeatedly, and each time change the parameter. Additionally, the time required to perform the functions was between 5 and 90 seconds, plus up to 10 seconds to render the results, due to the use of general purpose processors.

An alternative system, segmentation could only be performed on the three orthogonal slices of the volume which were currently displayed. Since the segmentation was limited to three 2D slices, the entire segmentation "process" could be performed from start each time. This way the user could achieve interactive feedback while sliding controls to adjust parameters for functions in the middle of the process. Unfortunately, to generate a 3D projection of the volume could take up to a few minutes to complete. Additionally, there was no analogous approach to perform 2D connected component processing, since regions could grow in the third dimension and return to the original slice. Therefore, connected component processing was limited to slow feedback.

Recently, a distributed processing environment for performing sequences of the same low-level functions has been proposed. This solution recognized the high degree of data-parallelism in volume segmentation and exploited this by utilizing a DECmpp 12000 massively parallel processor. The DECmpp is an implementation of the MasPar SIMD mesh of PEs. The performance with this processor was measured for a very small $96^3$ volume of sample data. Extrapolating the performance for a $256^3$ volume and faster clock rates from today's technology according to Moore's Law would require 1.14 seconds.

More recently, it has been proposed to perform low-level segmentation operations on a CM-200 SIMD massively parallel processor. By utilizing a mesh of $128^2$ PEs, it was possible to perform each low-level operation between 0.6 and 1.3 seconds per operation on a $256^3$ volume. Even with today's faster technology, the 0.3 to 0.65 seconds per operation could quickly add up to non-interactive frame rates for even a small number of low level tasks.

Exploiting data coherence by caching is a another well known technique to increase efficiency in computer graphics, see Sutherland et al. in "A characterization of ten hidden surface algorithms," Computing Surveys, 6(1), pp. 1–55, March 1974. Increasing the coherence of a computation can reduce the amount of memory used, the time it requires, or both. In systems that use ray tracing, the coherence of rays traveling through a scene can be increased by traversed ray trees to process rays into coherent bundles.

Similarly, rays with common origins can be gathered into frustums. This reduces the time to find intersecting objects. Rays can be reordered using space filling curves over the image plane to improve the coherence of spawned rays in a depth-first ray tracer. Monte Carlo ray tracing systems that is designed to improve coherence across all levels of the memory hierarchy, from processor caches to disk storage.

Pharr et al. in "Rendering complex scenes with Memory-Coherent Ray Tracing," Proceedings of SIGGRAPH 97, pp. 101–108," described a cached ray tracing system. There, texture tiles, scene geometry, queued rays, and image samples were stored on disk. Camera generated rays were partitioned into groups. Groups of rays were scheduled for processing depending on which parts of the scene was stored in main memory, and the degree to which processing the rays would advance the rendering. Scheduled rays were stored in queues in main memory. Scene geometry was added to main memory as needed. Any new rays that were generated during the ray tracing were added to the queues of waiting rays. Essentially, this system can be characterized as a memory hierarchy with two levels of cache, disk and main memory, and a single processor. This is basically a software solution to a caching problem. Also, Pharr only deals a single image at the time, and has coherency algorithm is only concerned with spatial locality.

To gain certain advantages, the system was designed to process only a single type of geometric primitive. "A distinguishing feature of our ray tracer is that we cache a singe type of geometric punitive: triangles. This has a number of advantages. Ray intersection tests can be optimized for a single case, and memory management for the geometry cache is easier, since there is less variation in the amount of space needed to store different types of primitives. It is also possible to optimize many other parts of the renderer when only one type of primitive is supported The REYES algorithm similarly uses a single internal primitive—micropolygons—to make shading and sampling more efficient. Unlike REYES, we optimize the system for handling large databases of triangles; this allows our system to efficiently handle a wide variety of common sources of geometry, including scanned data, scientific data, and tessellated patches. A potential drawback of this single representation is that other types of primitives, such as spheres, require more space to store after they are tessellated. We have found that the advantages of a single representation outweigh this disadvantage" iid, at p. 102.

Their geometry cache was organized in what they called "voxel" or geometry grids to enclose triangles. Note that in ray tracing, the term "voxel" has a totally different meaning than in volume rendering. In volume rendering, a voxel is a single sample in a three-dimensional (volume) data set. To distinguish these totally different meanings, in the description below, the term "voxel" always means a volume sample, and the term "block" refers to the granularity of the cache. Pharr et al. cached triangles in block sized quantities. A few thousand triangles per block yielded a good level of granularity for caching. However, they also used an acceleration grid holding a few hundred triangles for finer granularity.

For the purpose of scheduling blocks to be processed, they associated a cost value and a benefit value with each block. The cost was based on the computational complexity of processing the block, and the benefit estimated how much progress toward the completion of the computation would be made. Their scheduler used these values to choose blocks to work on by selecting the block with the highest ratio of benefit to cost.

It is desired to render scenes with ray tracing that are expressed in more than one single graphical primitive such as triangles. Furthermore, it is desired to gain additional performance improvements by using a software and hardware cache. In addition, it is desired to improve block scheduling beyond a simple cost-benefit algorithm. It is also desired to render a sequence of images or frames, and to provide temporal coherence in addition to spatial coherence. Furthermore it is desired to provided a programmable hardware architecture to perform complex visualization tasks.

SUMMARY OF THE INVENTION

It is an object of the invention to provide an improved ray tracing architecture for both sampled data and geometry data. The sampled data can be 2D, 3D, or sampled data in higher dimensions. The geometry data can be polygons, parametric patches, or analytically defined data. It is another object, to provide a hierarchical memory with embedded-DRAM technology to achieve real-time rendering rates. It is a further object, to improve performance by an order of magnitude using multiple levels of memory coherency. It is also an object to provide a programmable visualization engine that supports segmentation, ray tracing rendering, and other graphical processes.

More particularly, a method traces rays through graphical data. The graphical data includes sampled and geometry data. The method partitions the graphical data into a plurality of blocks according to a scheduling grid. For each block, a ray queue is generated. Each entry in the ray queue representing a ray to be traced through the block. The ray queues are ordered spatially and temporally using a dependency graph. The rays are traced through the blocks according to the ordered list.

BRIEF DESCRIPTION OF THE DRAWINGS

FIG. 6b is a dependency graph corresponding to the scheduling grid of FIG. 6a.

DETAILED DESCRIPTION OF THE PREFERRED EMBODIMENTS

Logical Architecture

Figure 1:
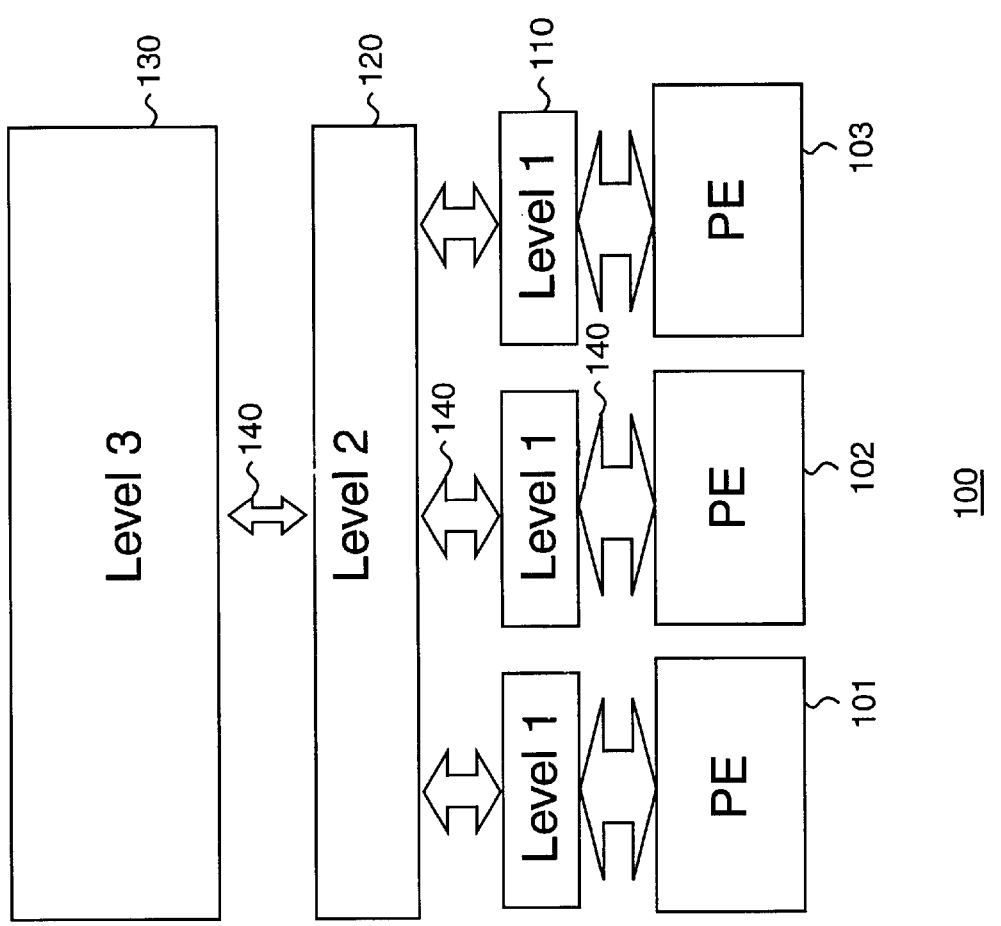
FIG. 1 is a block diagram of a logical representation of the programmable visualization system according to the invention.

FIG. 1 show a system 100 for visualization of sampled data (volume or images) and geometry data (polygons and patches) according to the present invention. Logically, the system 100 uses a memory and bandwidth hierarchy to reduce the effect of increasing the size of the data beyond what can fit in an on-chip or an on-board memory. The system includes a plurality of processor elements (PE) 101–103, first level caches 110, second level caches 120, and third level caches 130. The caches and processor elements interconnected by busses 140.

In FIG. 1, the memory hierarchy decreases from top-to-bottom while the bandwidth increases. This way, each level acts as a cache of the next higher level. It is not necessary for the entire data set to fit into the lowest, or even middle level of the memory hierarchy. However, if a portion of the data set which contributes to the final image fits into a given level, than, from frame to frame, that is over time, the PE's can take advantage of higher bandwidth while accessing the data set.

Physical Architecture

Figure 2:
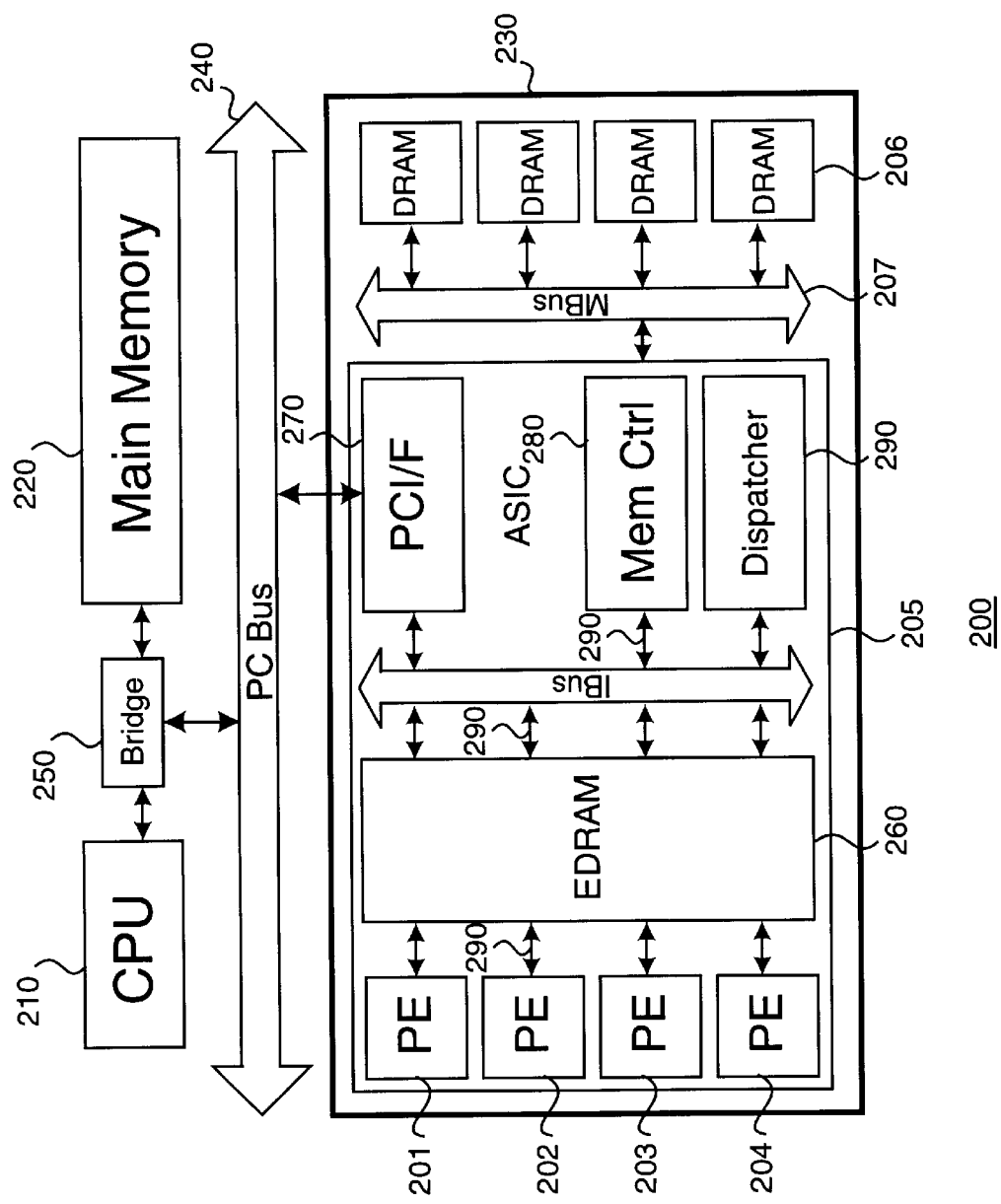
FIG. 2 is a block diagram of a physical representation of the visualization system according to the invention.

FIG. 2 shows a physical representation 200 of the visualization system according to the invention. The system includes a CPU 210, a main memory 220, and a visualization sub-system connected by a bus 240. The system can also include a bridge 250 interconnecting the CPU, the main memory, and the bus.

According to the invention, the sub-system is configured as a PC "plug-in" board. The visualization sub-system 230 includes an application specific integrated circuit (ASIC) 205 connected to DRAM 206 by a memory bus 207. The ASIC 205 includes processor elements (PE) 201–204, an embedded DRAM (EDRAM) 260, a PC interface (PC/IF) 270, a memory controller 280, and a dispatcher 290 connected by busses 290. In one embodiment, the ASIC performs coherent ray tracing. Other applications can include segmentation, and modeling.

The CPU 210 can be any standard microprocessor, for example, an Intel Pentium™ chip. The main memory 220 can be made of SIMM or DIMM. The board 230 can plug-into the PC system bus 240, which can be, for example, PCI, AGP, or SGI's IVC. The DRAM 206 can be SDRAM or Direct RamBUS. The ASIC 205 may contain one or more processing units as well as eDRAM memory organized in one or more banks. For example, Mitsubishi's M32 chips can be used. The M32 includes a single PE. ASICs with the latest eDRAM technology allow multiple PEs, and have much larger on chip storage. The processor elements have a very high bandwidth to the local embedded memory inside the chip. Multiple ASICs with multiple PEs per ASIC will yield even greater performance for the board. The system architecture takes advantage of this bandwidth to quickly transfer data currently stored in the eDRAM device to the PE's.

Normal sized data sets will not fit within the eDRAM. Therefore, the external DRAM memories 206 can be utilized to store the data until the processor elements within the ASIC are ready to utilize the data. For very large data sets that do not even fit within the DRAMs, the main memory is utilized until the sub-system is ready to process the data. This forms a three tiered memory hierarchy from the logical design to optimize the locality of data references.

Memory Coherence

In a ray-tracing application, the sub-system optimizes memory coherency of the data to be processed. This is done by accessing regions of memory in blocks, and performing as much processing as possible on each block before moving on to another block. The processing according to the invention orders the blocks so blocks which have a large amount of work ready to be performed on are processed before blocks which have a smaller amount of work to be performed. Also, block that are used for earlier frames are ordered before blocks used for later frames, even if the earlier blocks have less work to be done.

However, the ray-tracing sub-system according to the invention does not follow a strict processing order sequence as is utilized in conventional volume rendering accelerators. Instead, the work to be performed is grouped into three-dimensional blocks. Blocks are processed, e.g., rays are cast or traced, or segmentation is performed, according to an order where the block which will provide the most results while being the "closest" to the eDRAM memory is processed next. A heuristic metric, described below, decides the order in which block are processed.

For rendering applications where there is a mixture of volumetric and embedded polygonal objects, the system utilizes "ray queues." For volume processing applications such as segmentation, other metric are used to order the blocks coherently—both in the spatial and temporal domains.

Figure 3:
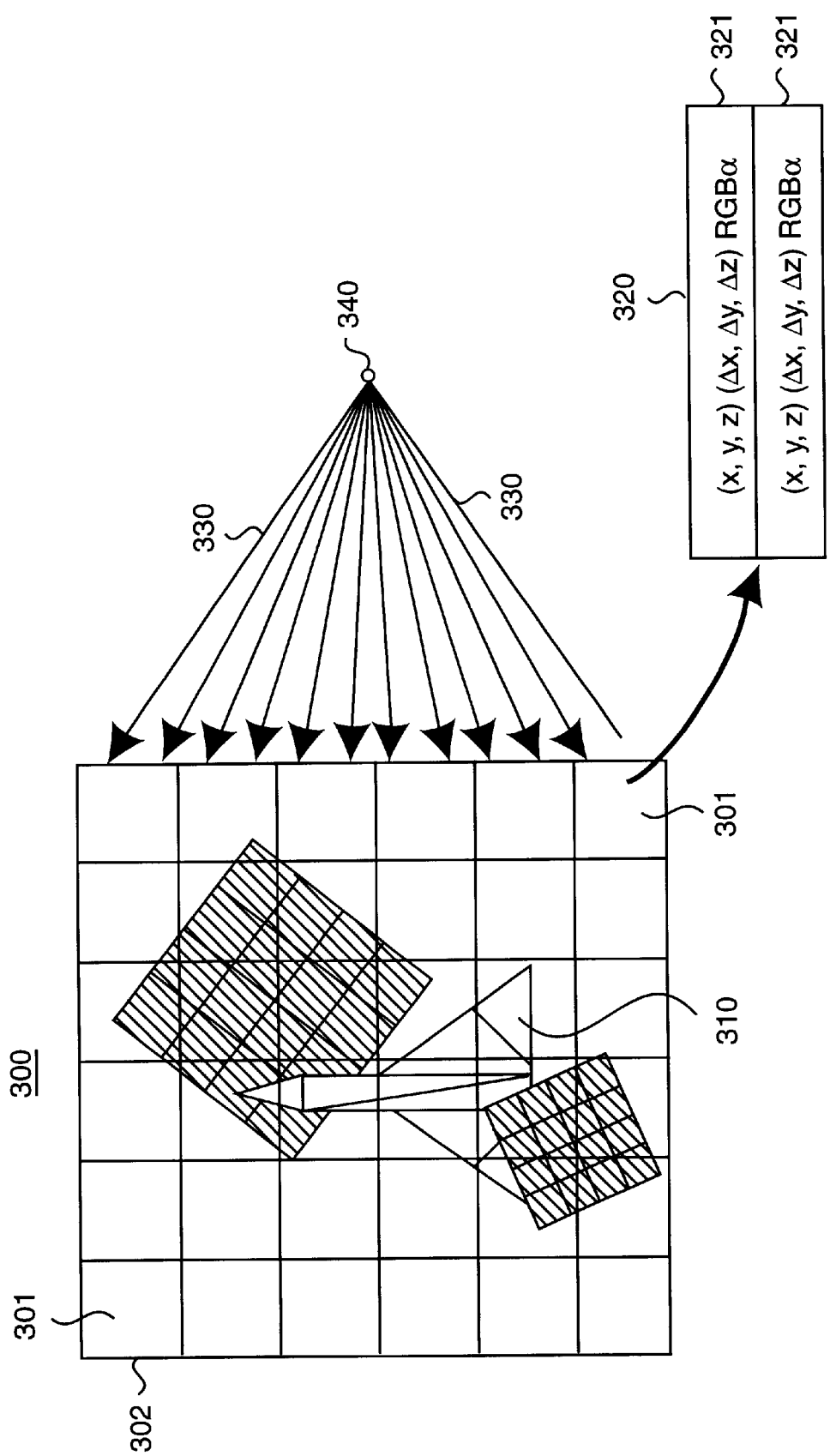
FIG. 3 is a block diagram of a scheduling grid superimposed on a scene to be rendered.

FIG. 3 shows a 2D top-down view of how a 3D scene 300 to be rendered is divided into blocks 301 according to a scheduling grid 302. All sampled and geometry data 310 are distributed among the scheduling grid blocks which they intersect. Rays 330 emanate from a view point 340. The rays can be generated conventionally. Associated with each block 301 is a ray queue 320. Each entry 321 in the ray queue specifies one of the rays 330 that currently intersect that block and that is waiting to be processed with the data stored within that scheduling grid block 302.

The data specifying the ray includes its (x,y,z) position, the increment ($\Delta x, \Delta y, \Delta z$) for the next trace step position, and the current accumulated RGBα value of the ray.

Figure 4:
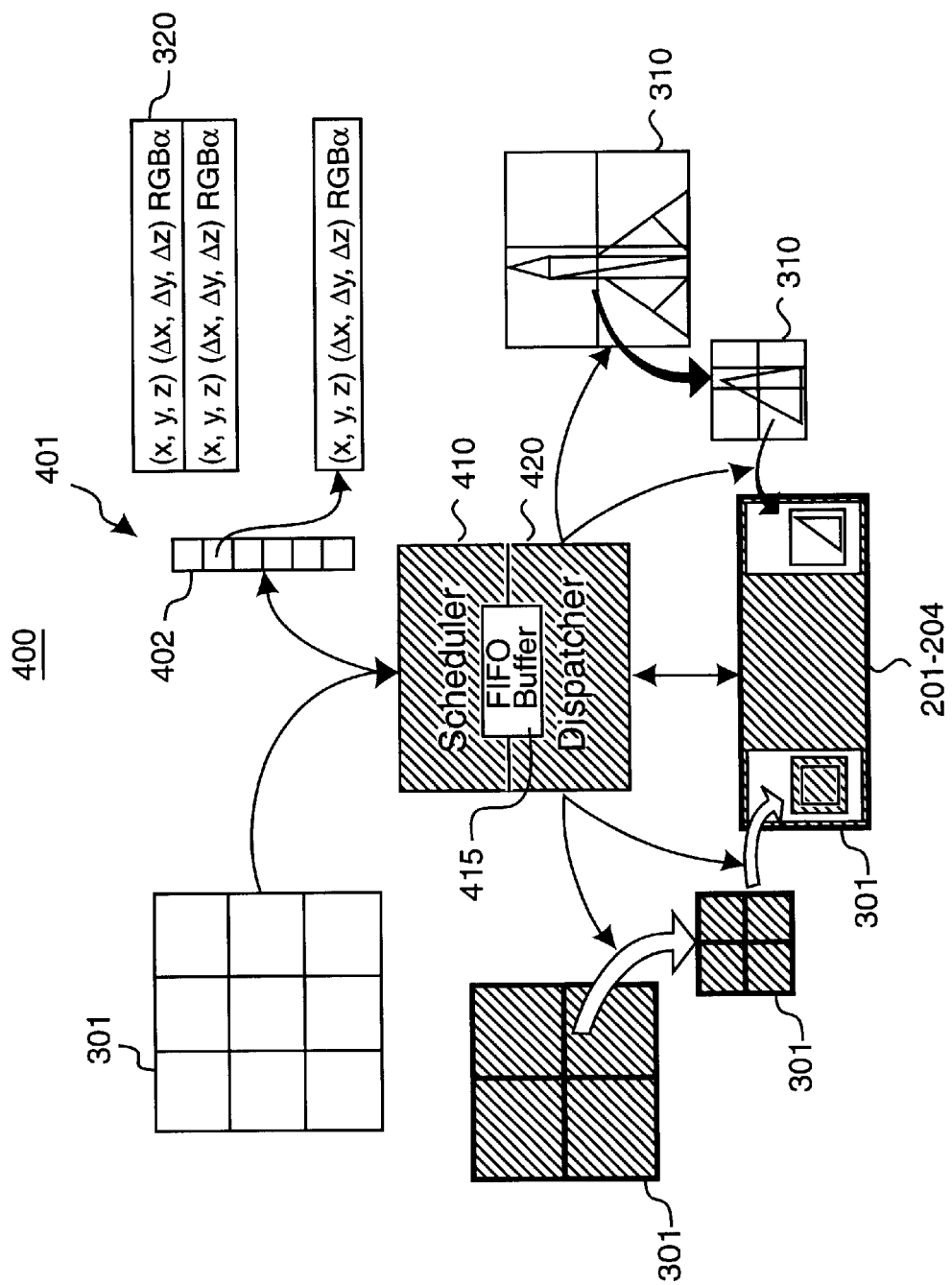
FIG. 4 is a flow diagram of a coherent scheduling method according to the invention.

FIG. 4 shows the flow of processing and data according to the ray tracing method according to the invention. At the heart of the system is a scheduler 410 and a dispatcher 420 communicating data via a first-in-first-out (FIFO) buffer 415. The scheduler has knowledge of application specifics, for example, the scheduling grid 302 and a ray list 401. Each entry 402 in the list 410 points to one of the ray queues 320.

The scheduler uses heuristics processes, described below, to determine which blocks to process, and in which order. The heuristics are visualization application specific. The scheduler stores a list of blocks to processed by the dispatcher in the FIFO buffer 415. The dispatcher transfers blocks to individual processor elements 201–204. The dispatcher also controls the movement of sampled and geometry data 310 among the three levels (110, 120, 130) of the memory hierarchy. This way, it is assured that the correct data are available to each of the processor elements 201–204 when the scheduler assigns a block to be processed. After the blocks have been placed in the FIFO buffer, the scheduler, independent of the specific visualization application, tries to move the blocks as close to the PE's as possible.

The data move though the level of the memory in different sized chunks depending on the level. For example, volumetric data for a specific frame can be divided into a hierarchical spatial subdivision. Thus, when volumetric data are needed by a processor element, and the data are only present in the highest level of the memory hierarchy, a large chunk of the volume will be moved to the next lower level, and an even smaller chunk will be moved all the way to the lowest level closest to the processor element.

Initially, the data are stored in the main memory 220. The CPU 210 generates initial ray information and loads the ray queues 320. The dispatcher starts transferring data to the DRAM 206 on the board 230 when the first block is ready to be processed. Blocks can also be loaded directly into the eDRAM 260. In actual practice, this can be achieved with a single read from main memory, and simultaneous write to both on-board DRAM and ASIC eDRAM.

As blocks are processed, the ray queues for the current block are read to determine how the ray intersects the sampled and geometry data in the block. When a ray exits the block and enters a next scheduling grid block, this information is placed on an appropriate ray queue for the next block. If the ray has reached full opacity, for ray casting, then no information is placed back into the ray queues.

When a processor element completes processing the current block, i.e., there are no more rays on the current block's queue), the processor element signals the scheduler to select a new block for the PE to process. The scheduler selects the best block based on the current state of the ray queues and the current state of the memories according to the heuristic metric. When all ray queues are empty (for ray casting), processing is completed and image samples can be collected for display or printing.

Scheduling Algorithms

The following scheduling algorithms can be used to select an order for processing the blocks.

Max Work

This algorithm schedules the block which, for example, contains the highest number of rays in its ray queue waiting to be processed.

Max Loaded Work

This algorithm examines the blocks loaded into the lowest level of the memory hierarchy, and thus the closest to the processor elements, and selects the block with the highest number of rays in its queue. If all loaded blocks have empty ray queues, i.e., there is no work to be done, then the Max Work algorithm is used to select the next best block to schedule, regardless of where in the memory hierarchy the next best block is currently stored.

Geometric

This algorithm takes advantage of the fact that the first rays, i.e., there is no reflection or refraction, rays from either a light source or a viewing frustum all travel outward from the originating point. Thus, blocks are processed in order from closest to the ray originating point 340 to farthest from the ray originating point. This way, before any block is processed, all the blocks that may send any rays into that block have already been processed. This way each block is processed exactly once. Of course, this does not hold for ray tracing, where spawned rays travel in an almost random directions with no common originating point. This is why other algorithms are still needed.

Dependency Graph

Rather than using the number of rays in the ray queue as a measure of the best block to process, this method utilizes a dependency graph. This method takes advantage of interframe coherence over time. For each frame, a dependency graph is generated. The dependency graph indicates which blocks send rays to which other blocks. For a later frame, the viewpoint (or camera angle) has probably moved only a small amount. Thus, most block used for the previous frame will still be valid for the next frame. Therefore, it is possible to utilize the graph built from the previous frame as a guide to approximate which blocks should be processed before which other blocks.

Figure 5C:
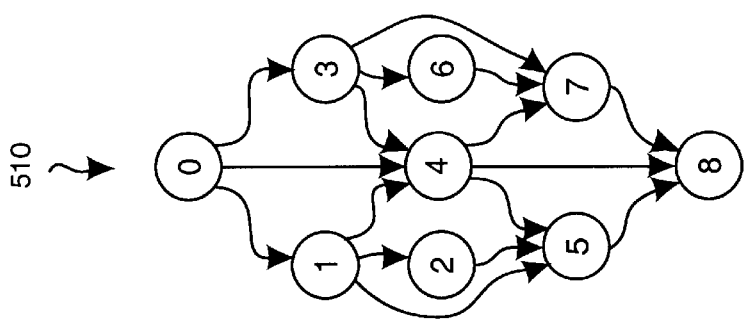
FIG. 5c is a rearranged dependency graph.
Figure 5B:
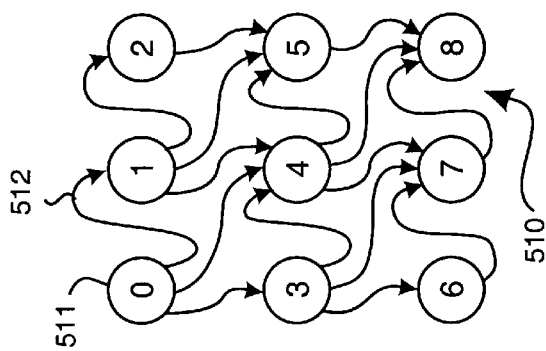
FIG. 5b is a dependency graph for a temporally and spatially ordered processing of blocks.
Figure 5A:
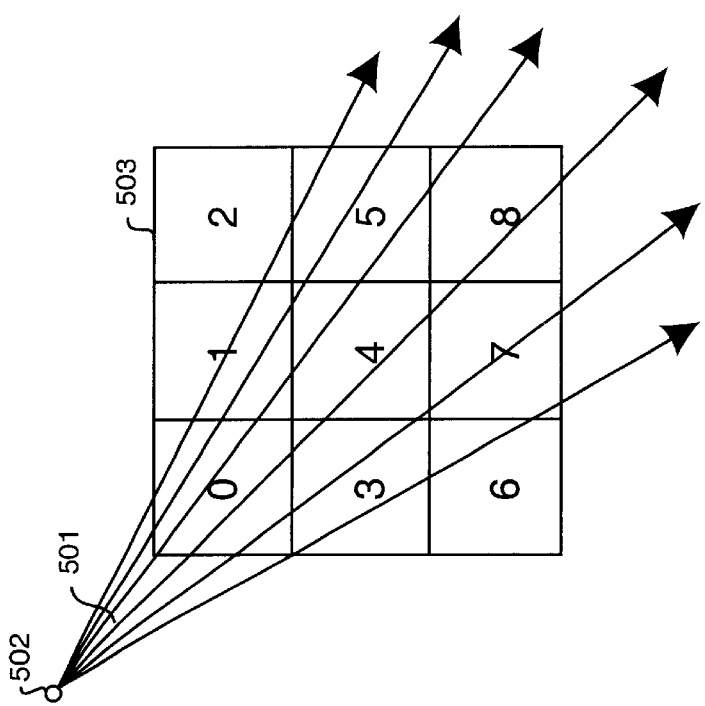
FIG. 5a is a block diagram of rays traversing a scheduling grid.

FIG. 5a shows an example of rays 501 cast from a viewpoint 502 through a scheduling grid 503. If there is no early ray termination, then is is possible for some rays to traverse as many as five blocks. FIG. 5b shows a dependency graph 510. In the graph, the nodes 511 are blocks, and the directed edges indicate rays leaving one block and entering the next. In FIG. 5b, it is difficult to see the flow of rays from block-to-block. FIG. 5c shows the same dependency graph as FIG. 5b but the nodes are rearranged so that all directed edges flow from top to bottom. Here, the optimal order for processing the blocks is clear.

For a simple 2D 3×3 scheduling grid with ray casting, it is easy to draw to a dependancy graph and to rearrange it so as to determine the optimal procesing order of the blocks. However, the scheduling grids for the system 100 can be 3D sampled data of a considerable size. While this makes it difficult to do a manual analysis, it is still possibel solve the optimal order computationally.

Figure 6B:
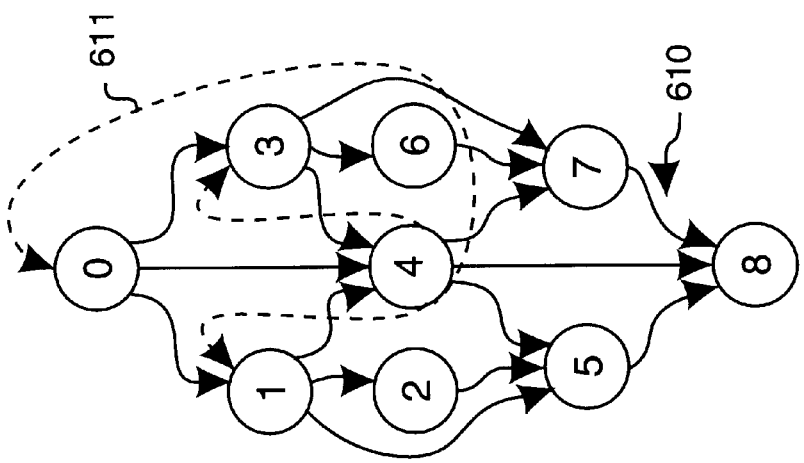
Figure 6A:
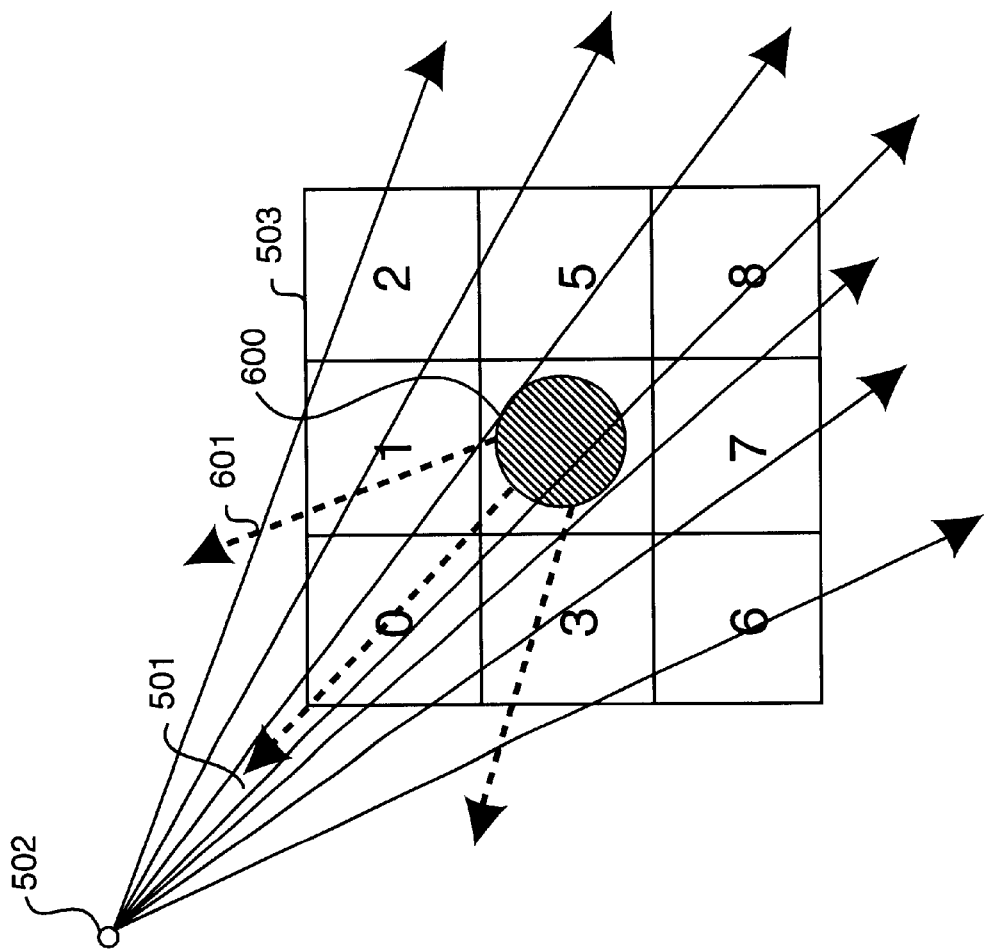
FIG. 6a is a block diagram of rays traversing a scheduling grid with reflected rays.

In addition, the system according to the invention also supports ray tracing. FIG. 6a shows the same simple 3×3 scheduling grid 503 for a ray tracing case where an object 600 is located in the center of the grid and the rays include reflected rays 601. FIG. 6b shows that the corresponding dependency graph 610 is less clear on indicating the order of processing blocks. The dashed edges 611 indicate dependancies due to the secondary reflected rays 601 causing cycles in the graph. In one ordering, primary rays are processed before reflected rays.

Figure 7B:
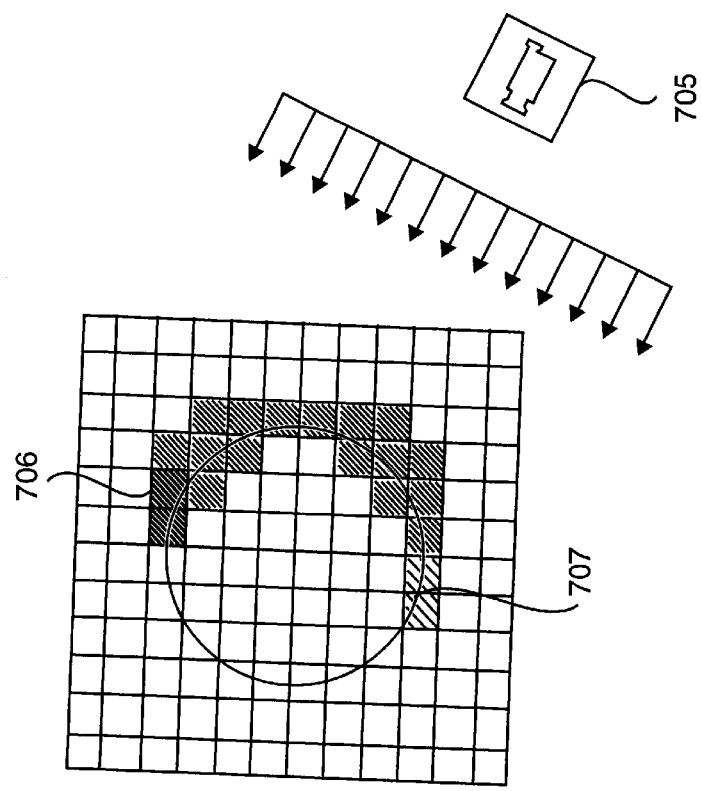
FIGS. 7a and 7b are block diagram of rays traced over time.
Figure 7A:
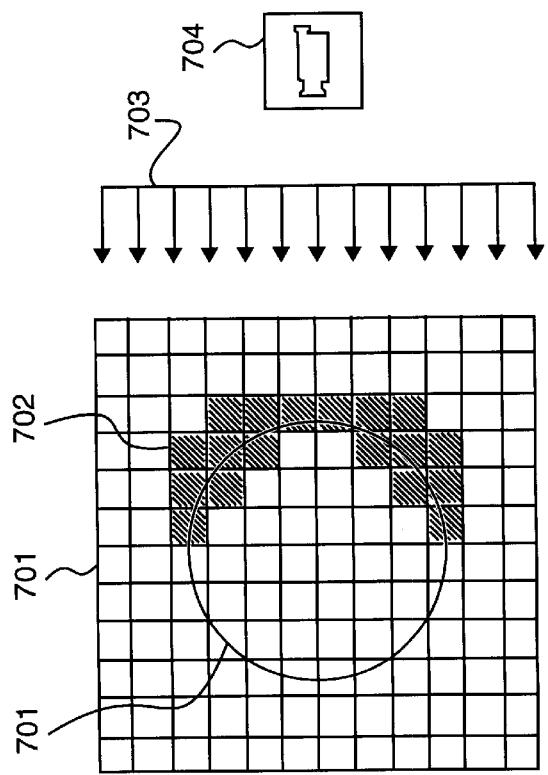

FIGS. 7a and 7b shows how temporal coherence is attained. In FIG. 7a, a grid 700 is superimposed on a graphical object 701, e.g. a sphere. Block 702 required for ray tracing are indicated in black. The rays 702 for a frame at time $t_0$ are generated from a camera position 704. At time $t_1$, the camera position 705 has shifted. A large number of block can be reused for the next frame, and these should remain in the lowest level of the cache. Only the new (cross-hatched) blocks 707 need to be identified.

Replacement Algorithms

When the dispatcher needs to load a block into a particular memory, and the memory area is full, some previously stored block needs to be evicted. The following replacement algorithms can be used to select a block to evict.

Random

This is a simple replacement algorithm which simply selects a random block to evict to make room for a new block. In some cases, this could be a block that will soon be needed.

Min Work

This is the logical opposite the Max Work scheduling algorithm. This algorithm replaces blocks with a small number of rays to be processed before blocks with a large number of rays.

Dependency Graph

This uses interframe coherence and the dependency graph built from the previous frame, in a manner similar to the scheduling algorithm.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for tracing rays through graphical data, comprising the steps of:

partitioning the graphical data into a plurality of blocks according to a scheduling grid;

generating, for each block, a ray queue, each entry in the ray queue representing a ray to be traced through the block; and ordering, temporally and spatially, the ray queues in a list for processing, wherein the plurality of blocks are stored in a physical, multi-level cache according to the order of the list;

wherein the ordering is performed by a scheduler;

wherein the physical, multilevel cache includes a third level of memory connected to a central processing unit, the third level of memory storing the graphical data, a second level of memory connected to the central processing unit by a system bus, the second level of memory for storing a sub-set of the plurality of blocks, and a first level of memory connected to the second level of memory by a memory bus, the scheduler storing an ordered list of blocks in the first level memory.

2. The method of claim 1 wherein a processor element connected to the first level of memory by a processor bus processes the blocks.

3. The method of claim 1 wherein a dispatcher is connected to the first, the second, and the third memories and the processor element, the dispatcher for transferring blocks from the third, to the second, and from the second to the third level memories according to the order of the list of blocks.

4. The method of claim 1 wherein the spatial order depends on the ray queue with the largest amount of rays.

5. The method of claim 1 wherein the spatial order depends the ray queue with the largest amount of rays in the lowest level of the memories.

6. The method of claim 1 wherein the temporal order is determined by a dependency graph.

7. The method of claim 1 further comprising the step of:

replacing the blocks in the multi-level cache according to a dependency graph.

* * * * *